United States Patent [19]

Chapman

[11] 4,030,932
[45] June 21, 1977

[54] SILVER HALIDE SENSITIZED WITH DYES CONTAINING AN ISOINDOLE NUCLEUS

[75] Inventor: Derek David Chapman, Rochester, N.Y.

[73] Assignee: Eastman Kodak Company, Rochester, N.Y.

[22] Filed: May 28, 1975

[21] Appl. No.: 581,463

[52] U.S. Cl. .................................. 96/127; 96/130; 96/140; 96/143; 260/240.1
[51] Int. Cl.² ...................... G03C 1/10; G03C 1/16
[58] Field of Search ..................... 96/127, 130, 143

[56] References Cited
UNITED STATES PATENTS

| | | | |
|---|---|---|---|
| 3,541,089 | 11/1970 | Haseltine et al. | 96/127 |
| 3,582,343 | 6/1971 | Mee | 96/130 |
| 3,598,603 | 8/1971 | Chapman | 96/130 |
| 3,600,184 | 8/1971 | Brooker et al. | 96/143 |

OTHER PUBLICATIONS

Mees and James, The Theory of the Photographic Process, Third Edition, pp. 256–261, The MacMillan Co., New York, 1966.

*Primary Examiner*—J. Travis Brown
*Attorney, Agent, or Firm*—J. G. Levitt

[57] ABSTRACT

Novel sensitizing dyes containing isoindole nuclei. These dyes can be used as spectral sensitizers for silver halide emulsions.

14 Claims, No Drawings

SILVER HALIDE SENSITIZED WITH DYES CONTAINING AN ISOINDOLE NUCLEUS

The invention relates to novel sensitizing dyes containing isoindole nuclei and photographic silver halide emulsions spectrally sensitized with such dyes.

It is known that various heterocyclic nuclei can be advantageously incorporated into cyanine or merocyanine dye structures to create or enhance the photographic utility of the dye. Thus U.S. Pat. No. 3,592,653 discloses cyanine dyes containing a pyrrole nuclues, U.S. Pat. No. 3,598,596 discloses cyanine dyes containing an indole nucleus, and U.S. Pat. No. 3,598,595 discloses cyanine dyes containing a pyrrole, a pyrrolo[2,3-b]pyridazine, or a pyrrolo[2,3-b]-quinoxaline nucleus; all of these cyanine dyes are disclosed as being spectral sensitizers for direct positive silver halide emulsions. Similarly, British Pat. No. 1,120,047 discloses merocyanine dyes containing a pyrrolidone nucleus, which dyes are useful as spectral sensitizers for silver halide emulsions.

Dyes containing isoindole nuclei are also known, such as the azadicarbocyanine dyes disclosed in Il'chenko and Rodchenko in *Khim. Getero. Soedinenii*, 1971, at pp. 454–458. However, these isoindole dyes have not proven to be useful as spectral sensitizing dyes possibly because the nitrogen atom of the isoindole nucleus takes part in the fundamental chromophore (the basic color conferring group within a dye molecule) of the dye.

The present invention relates to novel sensitizing dyes containing isoindole nuclei which useful as spectral sensitizers for silver halide emulsions. The novel dyes contain an isoindole nucleus having a substituent at the 2-position which is an alkyl or substituted alkyl group, a substituent at the 1-position which is a methine linkage terminated by a nitrogen atom containing basic heterocyclic nucleus or a carbonyl containing acidic nucleus and a substituent at the 3-position which is a halogen atom, an alkoxy group, a methine linkage terminated by a nitrogen atom containing basic heterocyclic nucleus.

In a perferred form, a dye of the invention comprises an isoindole nucleus, i.e.,

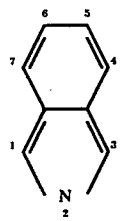

having a substituent at the 2-position which is an alkyl or substituted alkyl group, a substituent at the 1-position which is a methine linkage terminated by a nitrogen atom containing basic heterocyclic nucleus or a carbonyl containing acidic nucleus and a substituent at the 3-position which is a halogen atom, an alkoxy group, or a methine linkage terminated by a nitrogen atom containing basic heterocyclic nucleus. Most preferably, the nitrogen atom that terminates the methine chain is part of a 5 or 6 membered basic heterocyclic nucleus of the type used in cyanine dyes and the carbonyl group that terminates the methine chain takes part in forming a carbonyl containing acidic nucleus of the type used in merocyanine dyes.

It is noted that the 1-position and the 3-position of the isoindole nucleus are chemically equivalent; therefore even though the designations of position for two particular substituents of these positions might be expressed in two different ways, the compound identified by either expression would be the same. It should also be noted that the nitrogen atom of the isoindole nucleus never is part of the dye chromophore since the nitrogen atom is always linked to adjacent carbon atoms by two single bonds.

This invention also relates to photographic silver halide emulsions containing a sensitizing amount of a dye which contains an isoindole nucleus having a substituent at the 2-position which is an alkyl or substituted alkyl group, a substituent at the 1-position whch is a methine linkage terminated by a nitrogen atom containing basic heterocyclic nucleus or a carbonyl containing acidic nucleus and a substituent at the 3-position which is a halogen atom, an alkoxy groups, or a methine linkage terminated by a nitrogen atom containing basic heterocyclic nucleus.

The term alkyl as used herein refers to straight and branched chain saturated hydrocarbon groups having from 1 to 18 carbon atoms in the longest carbon chain (i.e., that chain which determines the group nomenclature) such as methyl, ethyl, propyl, isopropyl, n-butyl, isobutyl, tert-butyl, amyl, n-hexyl, n-octyl, n-nonyl, n-decyl, dodecyl, pentadecyl, etc. The term substituted alkyl refers to alkyl groups as described above in which one or more of the hydrogen atoms is replaced by another atom or group of atoms, such as chloroethyl, sulfoethyl, hydroxypropyl, carboxybutyl, etc. Alkyl and substituted alkyl groups of from one to four carbon atoms are preferred.

In one preferred form the dyes of the invention can be cyanine dyes.

The cyanine dyes of the invention can be represented more particularly by formula I

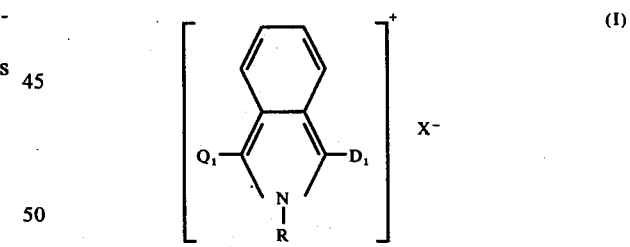

wherein R is an alkyl or substituted alkyl group as defined above; $Q_1$ is a group containing a nitrogen atom terminated methine chain having an odd numbered of carbon atoms in said chain; $D_1$ is a halogen atom, (e.g. flourine, chlorine, bromine, iodine) an alkoxy group, (e.g. methoxy, ethoxy, n-propoxy, isopropoxy, etc.), or a group containing a nitrogen atom terminated methine chain having an even number of carbon atoms in said chain; and $X^-$ represents an anion. Preferably, the nitrogen atom terminating the methine chain is part of a basic heterocyclic nucleus of the type used in cyanine dyes.

The anions represented by $X^-$ includes a wide variety of anions, such as bromide, chloride and iodide, sulfate, hydrosulfate, methylsulfate, p-toluene sulfonate, benzene sulfonate, acetate, trifluoroacetate, propionate, benzoate, perchlorate, cyanate, thiocyanate, sulfamate, etc.

In a preferred embodiment of the invention, $Q_1$ is a group represented by the formula

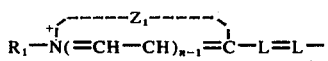

wherein $n$ represents a positive integer from 1 to 2, L represents a methine linkage (i.e., a group forming part of a methine chain represented by the formula

wherein E represents a hydrogen atom, a alkyl or substituted alkyl group, an aryl group, etc.), $R_1$ represents an alkyl or substituted alkyl group; and $Z_1$ represents the non-metallic atom necessary to complete a nitrogen containing basic nucleus of the type used in cyanine dyes.

Exemplary nitrogen containing basic nuclei of the type used in cyanaine dyes include the following: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naphtho[1,2-d] thiazole, 5-methoxynaphtho[2,3-d]thiazole, 5-ethoxynaphtho[2,3-d] thiazole, 8-methoxynaphtho[2,3-d]thiazole, 7-methoxynaphtho[2,3-d] thiazole, 4'-methoxythianaphtheno-7',6',4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2-d]-oxazole, etc.; a selenazole nucleus, e.g. 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylinodolenine nucleus, e.g. 3,3-dimethylindolenine, 3,3,5-trimethylindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-alkyl-5,6-dichlorobenzimidazole, 1-alkyl-1H naphth[1,2-d]imidazole, 1-aryl-3H-napth[1,2-d]imidazole, 1-alkyl-5-methoxy-1H-naphth[1,2-d]imidazole, etc.

In a further preferred embodiment of the invention, $D_1$ is a group represented by the formula

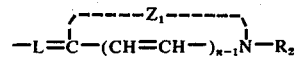

wherein $R_2$ represents an alkyl or substituted alkyl group, and $n$, L, and $Z_1$ are as previously defined.

Representative cyanine dyes of the invention include the following:
2-[2-(2-ethyl-3-methoxyisoindol-1-yl)vinyl]-3-ethyl benzothiazolium perchlorate,
2-[2-(2-ethyl-3-methoxyisoindol-1-yl)vinyl]-3-ethyl benzoxazolium perchlorate,
2-[2-(2-ethyl-3-methoxyisoindol-1-yl)vinyl]-1-ethyl naphtho[1,2-d]thiazolium perchlorate,
2-[2-(3-chloro-2-ethylisoindol-1-yl)vinyl]-3-ethyl benzothiazolium perchlorate,
2-{2-[2-ethyl-3-(ethylbenzothiazolin-2-ylidene methyl) isoindol-1-yl]vinyl}-3-ethylbenzothiazolium perchlorate,
2-{2-[2-ethyl-3-(3-ethylbenzothiazolin-2-ylidenemethyl) isoindol-1-yl]vinyl}-3-ethylbenzoxazolium perchlorate,
2-{2-[2-ethyl-3-(3-ethylbenzothiazolin-2-ylidenemethyl) isoindol-1-yl]vinyl}-1-ethylnaphtho[1,2-d]thiazolium perchlorate,
2-[2-(2-ethyl-3-methoxyisoindol-1-yl)vinyl]-1,2,3-trimethyl3H-indolium perchlorate, and
2-{2-[2-ethyl-3-(3-ethylbenzothiazolin-2-ylidenemethyl) isoindol-1-yl]vinyl}-1,3,3-trimethyl-3H-indolium perchlorate.

The merocyanine dyes of the invention can be represented more particularly either by formula II

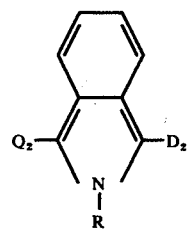

or by formula III

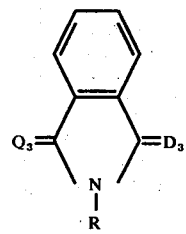

wherein $Q_2$ is a group represented by the formula

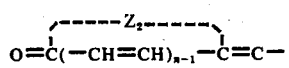

wherein n and L are as previously defined and $Z_2$ represents the non-metallic atoms necessary to complete a carbonyl containing acidic nucleus of the type used in merocyanine dyes; $D_2$ is a halogen atom or an alkoxy group; $Q_3$ is a group represented by the formula

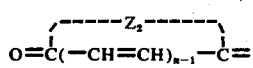

wherein n and $Z_2$ are as previously defined; and $D_3$ is a group represented by the formula

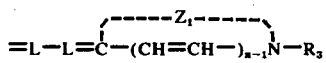

wherein $R_3$ represents an alkyl or substituted alkyl group and n, L, and $Z_1$ are as previously defined.

Exemplary carbonyl containing acidic nucleui of the type used in merocyanine dye include the following: a 2-pyrazolin-5-one nucleus, e.g., 3-methyl-1-phenyl-2-pyrazolin-5-one, 1-phenyl-2-pyrazolin-5-one, 1-(2-benzothiazolyl)-3-methyl-2-pyrazolin-5-one etc.; an isoxazolone nucleus, e.g., 3-phenyl-5(4H)-isoxazolone, 3-methyl-5-(4H)-isoxazolone, etc.; and oxindole nucleus, e.g., 1-alkyl-2-oxindoles, etc., a 2,4,6-triketohexahydropyrimidine nucleus e.g., barbituric acid or 2-thiobartiburic acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc.; or 1,3-diaryl (e.g., 1,3-diphenyl, 1,3-di(p-chlorophenyl), 1,3-di(p-ethoxycarbonylphenyl), etc.); or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives; a rhodanine nucleus (i.e., 2-thio-2,4-thiazolidinedione series), such as rhodanine, 3-alkylrhodanines, e.g., 3-ethylrhodanine, 3-allylrhodanine, etc., 3-carboxyalkylrhodanines, e.g., 3-(2-carboxyethyl)rhodanine, 3-(4-carboxybutyl)-rhodanine, etc., 3-sulfoalkylrhodanines, e.g., 3-(2-sulfoethyl)rhodanine, 3-(3-sulfopropyl)rhodanine, 3-(4-sulfobutyl)rhodanine, etc., or 3-arylrhodanines e.g., 3-phenylrhodanine, etc. a 2(3H)-imidazo[1,2-a]pyridone nucleus; a 5,7-dioxo-6,7-dihydro-5-thiazolo[3,2-a]pyrimidine nucleus, e.g., 5,7-dioxo-3-phenyl-6,7-dihydro-5-thiazolo[3,2-a]-pyrimidine, etc.; a 2-thio-2,4-oxazolidinedione nucleus (i.e., those of the 2-thio-2,4(3H, 5H)-oxazoledione series) e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3-(3-carboxypropyl)-2-thio-2,4-oxazolidinedione, etc. a thianaphthenone nucleus, e.g., 3-(2H)-thianaphthenone, etc.; a 2-thio-2,5-thiazolidinedione nucleus (i.e., the 2-thio-2,5-(3H,4H)-thiazoledione series), e.g., 3-ethyl-2-thio-2,5-thiazolidinedione, etc.; a 2,4-thiazolidinedione nucleus, e.g., 2,4-thiazolidinedione, 3-ethyl-2,4-thiazolidinedione, 3-phenyl-2,4-thiazolidinedione, 3-α-naphthyl-2,4-thiazolidinedione, etc.; a thiazolidinone nucleus, e.g., 4-thiazolidinone, 3-ethyl-4-thiazolidinone, 3-phenyl-4-thiazolidinone, 3-α-naphthyl-4-thiazolidinone, etc.; a 2-thiazolin-4-one nucleus, e.g., 2-ethylmercapto-2-thiazolin-4-one, 2-alkylphenylamino-2-thiazolin-4-one, 2-diphenylamino-2-thiazolin-4-one, etc.; a 2-imino-4-oxazolidinone (i.e., pseudohydantoin) nucleus, e.g. 2,4-imidazolidinedione, 3-ethyl-2,4-imidazolinedione, 3-phenyl-2,4-imidazolidinedione, 3-α-naphthyl-2,4-imidazolidinedione, 1,3-diethyl-2,4-imidazolidinedione, 1-ethyl-3-phenyl2,4-imidazolidinedione, 1-ethyl-3-α-naphthyl-2,4-imidazolidinedoine, 1,3-diphenyl-2,4-imidazolidinedione, etc.; a 2-thio-2,4-imidazolidinedione, etc.; a 2-thio-2,4-immidazolidinedione (i.e., 2-thiohydantoin) nucleus, e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.; a 2-imidazolin-5-one nucleus, e.g., 2-propylmercapto-2-imidazolin-5-one, etc.

Representative mercocyanine dyes of the invention include the following:

5-[2-ethyl-3-methoxyisoindol-1-yl)methylene]-3-ethylrhodanine,

5-[(3-chloro-2-ethylisoindol-1-yl)methylene]-3-ethylrhodanine, 3-ethyl-5-{2-ethyl-3-[(3-ethylbenzothiazolin-2-ylidene) ethylidene]isoindol-1-(3H)-ylidene}-rhodanine, and 3-ethyl-5-{2-ethyl-3-[(1,3,3-trimethylindolin-2-ylidene) ethylidene]isoindol-1(3H)-ylidene}-rhodanine.

Dyes of the present invention can conveniently be prepared by either of two methods, both starting with a 2-alkyl-1(3H)-isoindolone compound,

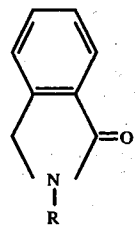

(IV)

wherein R is as previously defined.

In one method the 2-alkyl-1(3H)-isoindolone is first methylated (see Example 1), the methylated compound is then reacted with an electrophilic dye intermediate in a basic medium to yield a dinuclear cyanine (see Example 3) or merocyanine (see Example 6) dye. A trinuclear dye can be formed by reacting the methoxy containing dinuclear dye formed as in preceding reaction steps with a nucleophilic dye intermediate, resulting in a trinuclear dye in which the isoindole nuclei are linked by a methine chain which includes the isoindole nucleus (see Examples 10 and 12).

In another method the 2-alkyl-1(3H)-isoindolone in reacted by the method of Dobeneck et al, Chem. Ber. 102, p. 1357 (1969), using two moles of Vilsmeier reagent, to yield as an intermediate compound a 3-halo-1-dimethylaminoethylene-2-alkyl-1H-isoindolium salt (see Example 2). This intermediate compound is reacted with a 2-methyl quaternary salt in a basic medium to yield a dinuclear cyanine (see Example 7) or merocyanine (see Example 9) dye. Although the halogen substituent of the dinuclear dye prepared by this second method is not as reactive as the methoxy substituent on a dinuclear dye prepared by the first method, it can be reacted with a quaternary salt to yield a trinuclear dye. For example, 2-[2-(3-chloro-2-ethylisoindol-1-yl)vinyl]-3-ethylbenzothiazolium perchlorate (Example 7) could be reacted with 3-ethyl-2-methylbenzothiazolium p-toluenesulfonate to yield the trinuclear dye 2-{2-[2-ethyl-3-(3-ethylbenzothiazolin-2-ylidenemethyl)isoindol-1-yl]-vinyl}-3-ethylbenzothiazolium perchlorate (see Example 8).

The novel dyes of this inventio are useful as sensitizers for silver halide emulsions. The dyes may be used alone or in combination with other dyes or addenda useful in silver halide emulsions. The concentration of my new dyes in an emulsion can be widely varied, i.e., generally a sensitizing amount is from about 10 to about 1000 mg. per mole of silver halide and preferably from 20 to 200 mg. per mole of silver halide. The specific concentration will vary according to the type of light-sensitive material in the emulsion and according to the effects desired. The most advantageous dye concentration foor any given emulsion can be readily determined by making the tests and observations customarily used in the art of emulsion making.

The silver halide emulsions useful according to this invention can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith *The Photographic Journal*, Vol. LXXIX, May, 1939 (pp 330–338,), double jet emulsions such as Lippmann emulsions, ammoniacal emulsions, thiocyanate or thioether ripened emulsions such as those described in Nietz et al U.S. Pat. 2,222,264 issued Nov. 19, 1940; Illingsworth U.S. Pat. No. 3,320,069 issued May 16, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al U.S. Pat. No. 2,592,250 issued May 8, 1952; Porter et al U.S. Pat. No. 3,206,313 issued Sept. 14, 1965; Berriman U.S. Pat. No. 3,367,778 issued Feb. 6, 1968 and Bacon et al U.S. Pat. No. 3,447,927 issued June 3, 1969. If desired, mixture of such surface and internal image-forming emulsions can be made, such being described in Luckey et al U.S. Pat. No. 2,996,382 issued Aug. 15, 1961. Silver halide emulsions can be regular grain emulsions such as the type described in Klein and Moisar, *J.Phot. Sci.*, Vol. 12, No. 5, September/October, 1964, pp 242-251 and German Pat. No. 2,107,118. Negative type emulsions can be made, as well as direct positive emulsions as described in Leermakers U.S. Pat. No. 2,184,013 issued Dec. 19, 1939; Kendall et al U.S. Pat. No. 2,541,472 issued Feb. 13, 1951; Schouwenaars British Pat. No. 723,019 issued Feb. 2, 1955; Illingsworth et al French Pat. No. 1,520,821 Mar. 4, 1968; Illingsworth U.S. Pat. No. 3,501,307 issued Mar. 17, 1970; Ives U.S. Pat. No. 2,563,785 issued Aug. 7, 1951; Knott et al U.S. Pat. No. 2,456,953 issued Dec. 21, 1948 and Land U.S. Pat. No. 2,861,885 issued Nov. 25, 1958.

The silver halide emulsions may additionally contain various other useful photographic addenda such as those listed in *Product Licensing Index*, Vol. 92, December 1971, publi-9232, pages 107–110 at paragraphs III, IV, V, VI, VII, VIII, XI, XII, XIII and XIV.

The silver halide emulsions may be coated on suitable supports such as those disclosed in *Product Licensing Index*, Vol. 92, December 1971, publication 9232, pages 107–110 at paragraph X and thereby form a useful photographic element.

In the following examples and tables, Examples 1 and 2 illustrate the preparation of the intermediate compounds for the two methods disclosed, Examples 3–15 illustrate preparation of cyanine and merocyanine dyes of the invention, and Tables I–III illustrate the sensitizing properties of the dyes of the invention.

Example 1 (Intermediate)

2-ethyl-3-methoxy-1H-isoindolium fluorosulfonate

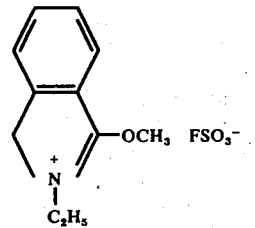

(V)

2-ethyl-1-(3H)-isoindolone (1.6 g) was dissolved in dry methylene chloride, and methyl fluorosulfonate (1.2 g) was was added. The reaction mixture was stirred for 30 minutes and then evaporated to dryness. The resuling oil was triturated with acetonitrile and ether. The solid intermediate compound was collected by filtration and used for preparing dyes without further purification.

EXAMPLE 2 (Intermediate)

3-chloro-1-dimethylaminomethylene-2-ethyl-1H-isoindolium perchlorate (VI)

$(CH_3)_2N-CH= \phantom{xxx} =Cl \quad ClO_4^-$

Phosphoryl chloride (39.8 g) was added dropwise to a solution of dimethylformamide (19.0 g) in chloroform (100 ml.) at 0° C over a period of 45 minutes. A solution of 2-ethyl-1(3H)-isoindolone (20 g) in chloroform was then added dropwise to the previous mixture at 0° C. The reaction mixture was heated at reflux for 2 hours, and was then concentrated under vacuum. The residue was dissolved in methanol and then aqueous sodium perchlorate (17 g/25 ml water) was added. The pale yellow crystals were collected by filtration. M.P. 173°–175° C.

EXAMPLE 3

2-[2-(2-Ethyl-3-methoxyisoindol-1-yl)vinyl]-3-ethyl-benzothiazolium perchlorate

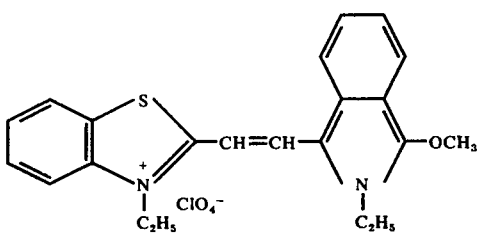

(VII)

2-Ethyl-3-methoxy-1H-isoindolium fluorosulfonate (1.85 g) and 2-(2-acetanilidovinyl)-3-ethylbenzothiazolium perchlorate (1.4 g) were dissolved in acetonitrile. Triethylamine was added and the reaction mixture stirred for 30 minutes. At the end of this time the dye had separated as the fluorosulfonate. It was filtered off, dissolved in boiling methanol and converted to the perchlorate. After recrystallization from ethanol, the dye melted at 208° C dec. $CH_3OH$ λ max 555 nm.

EXAMPLE 4

2-[2-(2-Ethyl-3-methoxyisoindol-1-yl)vinyl]-3-ethyl-benzoxazolium perchlorate

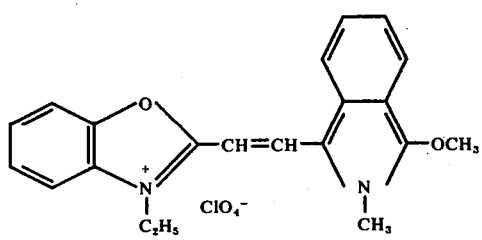

(VIII)

This dye was prepared by the method described in Example 3 except that 2-(2-acetanilidovinyl)-3-ethyl-benzoxazolium perchlorate was used in place of the corresponding benzothiazolium derivative used in Example 3. After recrystallization from methanol, the dye melted at 215° C. $CH_3OH$ λ max 520 nm

EXAMPLE 5

2-[2-(2-Ethyl-3-methoxyisoindol-1-yl)vinyl]-1-ethyl-naphtho[1,2-d]thiazolium perchlorate

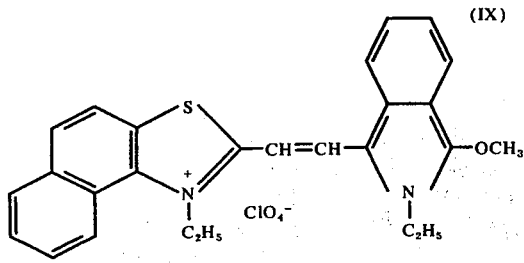

(IX)

This dye was prepared by the method described in Example 3 except that 2-(2-acetanilidovinyl)-1-ethyl-naphtho[1,2-d]thiazolium perchlorate was used in place of the corresponding benzothiazolium derivative. After recrystallization from acetonitrile the dye melted at 208°–210° C. $CH_3CN$ λ max 576 nm.

EXAMPLE 6

5-[2(2-Ethyl-3-methoxyisoindol-1-yl)methylene]-3-ethylrhodanine

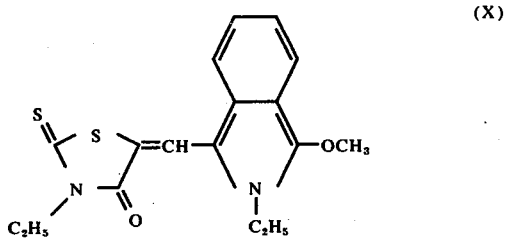

(X)

2-Ethyl-3-methoxy-1H-isoindolium fluorosulfonate (0.28 g) and 5-acetanilidomethylene-3-ethylrhodanine (0.31 g) were dissolved in ethanol and triethylamine added. The solution was filtered to remove a trace of colorless material and then concentrated. The product separated out and was collected by filtration. After recrystallization from ethanol. 108°–110° C. MeOH λ max 550 nm.

EXAMPLE 7

2-[2-(3-Chloro-2-ethylisoindol-1-yl)vinyl]-3-ethylbenzothiazolium perchlorate

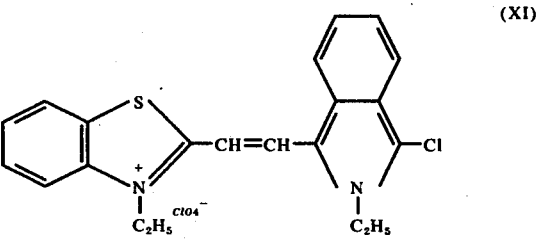

(XI)

3-chloro-1-dimethylaminomethylene-2-ethyl-1H-isoindolium perchlorate (0.5 g) and 3-ethyl-2-methyl-benzothiazolium p-toluene sulfonate (0.5 g) were dissolved in acetonitrile and triethylamine added. After 30 minutes at room temperature the product was precipitated by the addition of ether and purified by chromatography on silica gel. After recrystalization from ethanol, the purified product melted at 244° C. $CH_3CN$ λ max 553 nm.

EXAMPLE 8

2-{2-[2-Ethyl-3-(3-ethylbenzothiazolin-2-ylidenemethyl)isoindol-1-yl]-vinyl}-3-ethylbenzothiazolium perchlorate

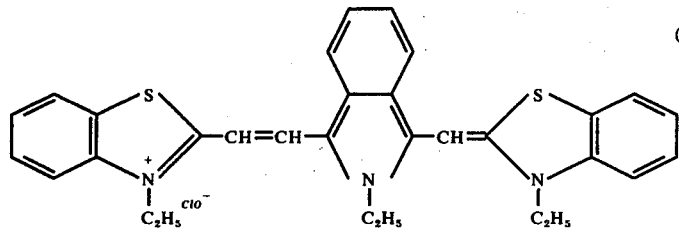

(XII)

This dye was prepared from the same intermediates used in Example 7 except that 2 moles of the benzothiazolium salt were used instead of one mole. The reaction mixture was heated at the boiling point for 1 hour. The crude dye was converted to the perchlorate and chromatographed on silica gel. After recrystallization from ethanol, the purified dye melted at 258°–259° C. MeOH λ max 663 nm.

EXAMPLE 9

5-[(3-Chloro-2-ethylisoindol-1-yl)methylene]-3-ethylrhodanine

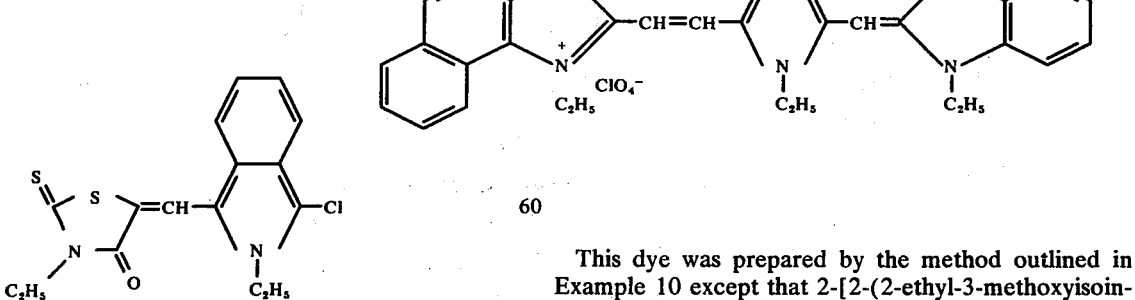

This dye was prepared by the interaction of 3-ethylrhodanine and 3-chloro-1-dimethylaminomethylene-2-ethyl-1H-isoindolium perchlorate in the presence of triethylamine. The dye after purification by recrystallization from methanol melted at 119° C. MeOH λ max 505 nm.

EXAMPLE 10

2-{2-[2-Ethyl-3-(3-ethylbenzothiazolin-2-ylidenemethyl)isoindol-1-yl]-vinyl}-3-ethylbenzoxazolium perchlorate

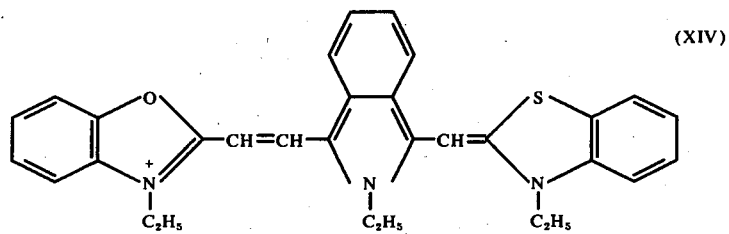

(XIV)

2-[2-(2-Ethyl-3-methoxyisoindol-1-yl)vinyl]-3-ethylbenzoxazolium perchlorate (1.0 g) and 3-ethyl-2-methylbenzothiazolium p-toluenesulfonate (0.9 g) were dissolved in acetonitrile. Triethylamine was added and the reaction mixture stirred until the absorption at 520 nm disappeared. The reaction mixture was evaporated to dryness and chromatographed on silica gel. After recrystallization of the product from methanol, the melting point was 180° C. $CH_3CN$ λ max 625 nm.

EXAMPLE 11

2-{2-[2-Ethyl-3-(3-ethylbenzothiazolin-2-ylidenemethyl)isoindol-1-yl]vinyl}-1-ethylnaphtho[1,2-d]thiazolium perchlorate (XV)

This dye was prepared by the method outlined in Example 10 except that 2-[2-(2-ethyl-3-methoxyisoindol-1-yl)vinyl]-1-ethylnaphtho[1,2-d]thiazolium perchlorate was used in place of the corresponding benzoxazolium derivative. The dye was purified by chromatography on silica gel and recrystallization from methanol. M.P. 248° C. $CH_3CN$ λ 680 nm.

EXAMPLE 12

3-Ethyl-5- 2-ethyl-3-[(3-ethylbenzothiazolin-2-ylidene) ethylidene]isoindol-1(3H)-ylidene -rhodanine

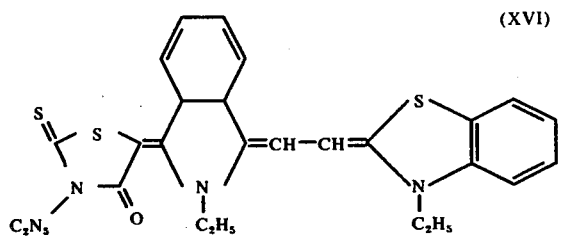

(XVI)

2-[2-(2-Ethyl-3-methoxyisoindol-1-yl)vinyl]-3-ethylbenzothiazolium perchlorate (0.5 g) and 3-ethylrhodanine (0.3 g) were dissolved in a 1:1 acetronitrile/methanol solution. Triethylamine was added and the reaction mixture heated to reflux for 10 minutes. The dyes which separated out was dissolved in chloroform and passed through a column of silica gel. After recrystallization from a mixture of chloroform and methanol the dye melted at 252°–253° C. pyridine/methanol λ max 661 nm.

EXAMPLE 13

2-[2-(2-Ethyl-3-methoxyisoindol-1-yl)vinyl]-1,3,3-trimethyl 3H-indolium perchlorate

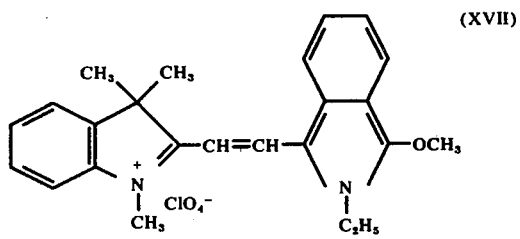

(XVII)

This dye was prepared by the method of Example 3 except that 2-(2-acetanilidovinyl)-1,3,3-trimethyl-3H-indolium perchlorate was used in place of the benzothiazolium derivative. CH$_3$CN λ max 540 nm.

EXAMPLE 14

3-Ethyl-5-{2-ethyl-3-[(1,3,3-trimethylindolin-2-ylidene) ethylidene]-isoindol-1(3H)-ylidene}rhodanine

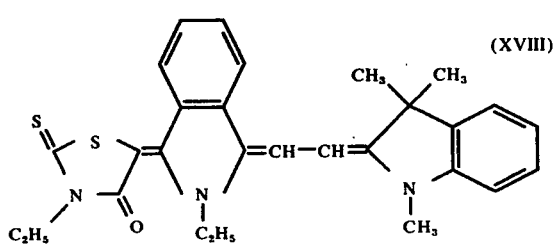

(XVIII)

This dye was prepared by the method described in Example 12 except that 2-[2-(2-ethyl-3-methoxyisoindol-1-yl)vinyl]-1,3,3-trimethyl-3H-indolium perchlorate was used in place of the corresponding benzothiazolium derivative. After recrystallization from acetic acid the purified dye melted at 214–5° C. CH$_3$CN λ max 626 nm.

EXAMPLE 15

2-{2-[2-Ethyl-3-(3-ethylbenzothiazolin-2-ylidenemethyl) isoindol-1-yl]vinyl}-1,3,3-trimethyl-3H-indolium perchlorate

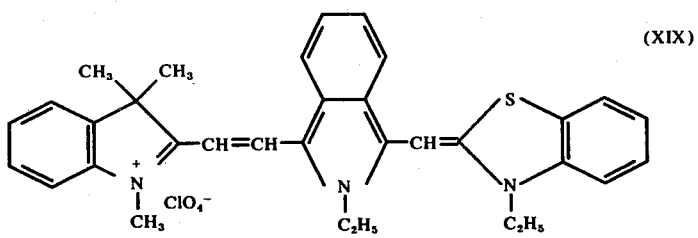

(XIX)

This dye was prepared by the method described in Example 8 except that 2-[2-(2-ethyl-3-methoxyisoindol-1-yl)vinyl]-1,3,3-trimethyl-3H-indolium perchlorate was used in place of the benzoxazolium derivative. After recrystallization from acetonitrile the purified dye melted at 277° C. λ max 645 nm.

The dyes listed in Tables I, II, and III were tested in a 0.2 um sulfur and gold sensitized monodispersed gelatino silver bromoiodide emulsion containing 2.5 mole % iodide, coated on cellulose acetate supports at 0.11 mg./dm.$^2$. The emulsion coatings listed in Tables I and II were exposed to a tungsten light source in an Eastman 1B sensitometer through a wedge spectrograph and through a continuous step wedge using a Wratten 16 filter (minus blue). The emulsion coatings in Table III were exposed to a quartz-halogen light source through a Wratten 80B color correcting filter, diffraction grating with filters to remove second order transmission and superimposed step wedge. After exposure, the emulsion coatings listed in Table I were developed for 6 minutes in an Elon-hydroquinone developer, then fixed. washed, and dried. The emulsion coatings in Tables II and III were developed ina Kodak Versamat roller transport processor for 80 seconds at 23° C. in an Elon-hydroquinone developer. The control dyed emulsions in Tables I and II were sensitized with 3-carboxymethyl-5-[(3-methyl-2-thiazolidinylidene)-1-methylethylidene]rhodanine. The control dyed emulsion in Table III was sensitized with anhydro 3', 9-diethyl-5'-methoxy-5-phenyl-3-(3-sulfobutyl)-oxaselena-carbocyanine hydroxide. The concentrations of dye expressed are in moles of dye/moles Ag $\times 10^{-4}$.

Table I

| Coating | Dye | Conc. | Rel. 365 nm Line Speed | Rel. Minus Blue Speed | Sens. Max (nm) | Sens. Range (nm) |
| --- | --- | --- | --- | --- | --- | --- |
| a1 | control-undyed emulsion | — | 100 | — | — | 380–495 |
| a2 | control-dyed emulsion | 7.0 | 219 | 100 | 540 | 380–580 |
| a3 | (VII) | 4.3 | 186 | 115 | 595 | to 630 |
| a4 | (X) | 2.9 | 170 | 115 | 575 | to 625 |
| a5 | (XI) | 5.4 | 38 | 10.7 | 600 | 530–620 |
| a6 | (XII) | 1.6 | 132 | 174 | 700 | 560–760 |
| a7 | (XIII) | 2.9 | 85 | 9.5 | 590 | 530–620 |
| a8 | (XVI) | 1.1 | 145 | 27.5 | 700 | 600–745 |

Table II

| Coating | Dye | Conc. | Rel. 365 nm Line Speed | Rel. Minus Blue Speed | Sens. Max. (nm) | Sens. Range (nm) |
| --- | --- | --- | --- | --- | --- | --- |
| b1 | control-undyed emulsion | — | 100 | — | — | 380–495 |
| b2 | control-dyed emulsion | 6.0 | 162 | 100 | 540 | 380–580 |
| b3 | (VIII) | 6.0 | 331 | 135 | 550 | 490–580 |
| b4 | (IX) | 2.0 | 269 | 269 | 610 | 500–660 |
| b5 | (XV) | 1.0 | 174 | 209 | 730 | 580–770 |
| b6 | (XIX) | 6.0 | 105 | 58 | 720 | 580–740 |
| c1 | control-undyed emulsion | — | 100 | — | — | 380–495 |
| c2 | control-undyed emulsion | 6.0 | 214 | 100 | 540 | 380–580 |
| c3 | (XIV) | 6.0 | 251 | 447 | 670 | 520–730 |
| c4 | (XVIII) | 6.0 | 159 | 407 | 690 | 530–740 |

In contrast to the sensitizing properties of the isoindole dyes of the present invention, previously known isoindole dyes, such as those represented by the formulas

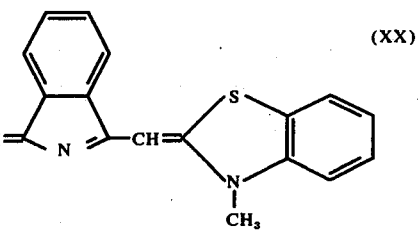

(XX)

and

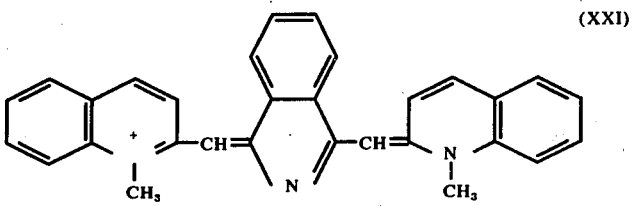

(XXI)

disclosed by Il'chenko, supra, are not useful as spectral sensitizers for negative silver halide emulsions. Although both dyes (XX) and (XXI) absorb light broadly in the visible region, with λ max at $620_{nm}$ and $672_{nm}$, respectively, it is seen from Table III that neither dye is a useful sensitizer for a negative silver halide emulsion, but rather cause desensitization.

Table III

| Coating | Dye | Conc. | Rel. 400 nm Line Speed | Sens. Max (nm) | Rel. at Sens. Max. | Sens. Range (nm) |
| --- | --- | --- | --- | --- | --- | --- |
| d1 | control-undyed emulsion | — | 100 | — | — | 390–480 |
| d2 | control-dyed | | | | | |

Table III-continued

| Coating | Dye | Conc. | Rel. 400 nm Line Speed | Sens. Max (nm) | Rel. at Sens. Max. | Sens. Range (nm) |
|---|---|---|---|---|---|---|
|  | emulsion | 6.0 | 229 | 610 | 100 | 490–660 |
| d3 | (XX) | 2.0 | 67 | — | — | 390–480 |
| d4 | (XX) | 6.0 | 27.5 | — | — | 390–480 |
| d5 | (XX) | 8.0 | * | — | — | 390–480 |
| d6 | (XXI) | 2.0 | * | — | — | — |
| d7 | (XXI) | 6.0 | * | — | — | — |
| d8 | (XXI) | 8.0 | * | — | — | — |

* no image

Although the invention has been described in considerable detail with particular reference to certain preferred embodiments thereof, it will be understood that variations and modifications can be effected within the spirit and scope of the invention as described hereinabove, and as defined in the appended claims.

I claim:

1. A photographic silver halide emulsion spectrally sensitized with a cyanine dye comprising an isoindole nucleus represented by the formula

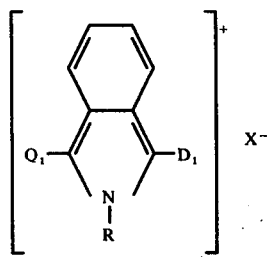

wherein R is an alkyl or substituted alkyl group;
$Q_1$ is a methine chain having an odd number of carbon atoms terminated with a nitrogen atom contained in a basic heterocyclic nucleus of the type used in cyanine dyes;
$D_1$ is a halogen atom, an alkoxy group, or a methine chain having an even number of carbon atoms terminated with a nitrogen atom contained in a basic heterocyclic nucleus of the type used in cyanine dyes; and
$X^-$ represents an anion.

2. A photographic silver halide emulsion spectrally sensitized with a cyanine dye as in claim 1 wherein R is an alkyl or substituted alkyl group containing from one to four carbon atoms.

3. A photographic silver halide emulsion spectrally sensitized with a cyanine dye as in claim 1 wherein $Q_1$ is a group represented by the formula

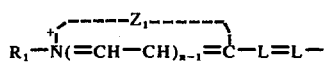

wherein n represents a positive integer from 1 to 2;
L represents a methine linkage;
$R_1$ represents an alkyl or substituted alkyl group; and
$Z_1$ represents the non-metallic atoms necessary to complete a basic heterocyclic nucleus of the type used in cyanine dyes.

4. A photographic silver halide emulsion spectrally sensitized with a cyanine dye as in claim 1 wherein $D_1$ is a group represented by the formula

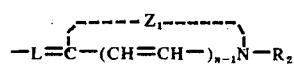

wherein n represents a positive integer from 1 to 2;
L represents a methine linkage;
$R_2$ represents an alkyl or substituted alkyl group; and
$Z_1$ represents the non-metallic atoms necessary to complete a basic heterocyclic nucleus of the type used in cyanine dyes.

5. A photographic silver halide emulsion spectrally sensitized with a cyanine dye selected from the group consisting of
2-[2-(2-ethyl-3-methoxyisoindol-1-yl)vinyl]-3-ethylbenzothiazolium perchlorate,
2-[2-(2-ethyl-3-methoxyisoindol-1-yl)vinyl]-3-ethylbenzoxazolium perchlorate,
2-[2-(2-ethyl-3-methoxyisoindol-1-yl)vinyl]-1-ethylnaphtho[1,2-d]thiazolium perchlorate,
2-[2-(3-chloro-2-ethylisoindol-1-yl)vinyl]-3-ethylbenzothiazolium perchlorate,
2-{2-[2-ethyl-3-(ethylbenzothiazolin-2-ylidenemethyl)isoindol-1-yl]vinyl}-3-ethylbenzothiazolium perchlorate,
2-{2-[2-ethyl-3-(3-ethylbenzothiazolin-2-ylidenemethyl)isoindol-1-yl]vinyl}-3-ethylbenzoxazolium perchlorate,
2-{2-[2-ethyl-3-(3-ethylbenzothiazolin-2-ylidenemethyl)isoindol-1-yl]vinyl}-1-ethylnaphtho[1,2-d]thiazolium perchlorate,
2-[2-(2-ethyl-3-methoxyisoindol-1-yl)vinyl]-1,3,3-trimethyl-3H-indolium perchlorate, and
2-{2-[2-ethyl-3-(3-ethylbenzothiazolin-2-ylidenemethyl)isoindol-1-yl]vinyl}-1,3,3-trimethyl-3H-indolium perchlorate.

6. A photographic silver halide emulsion spectrally sensitized with a merocyanine dye comprising an isoindole nucleus represented by the formula

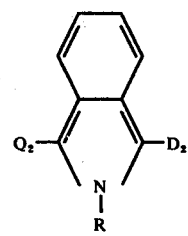

(II)

wherein R is an alkyl or substituted alkyl group;
$Q_2$ is a group represented by the formula

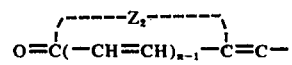

wherein n represents a positive integer from 1 to 2,
L represents a methine linkage, and
Z₂ represents the non-metallic atoms necessary to complete an acidic nucleus of the type used in merocyanine dyes; and D₂ is a halogen atom or an alkoxy group.

7. A photographic silver halide emulsion spectrally sensitized with a merocyanine dye as in claim 6 wherein R is an alkyl or substituted alkyl group containing from one to four carbon atoms.

8. A photographic silver halide emulsion spectrally sensitized a merocyanine dye selected from the group consisting of
5-[(2-ethyl-3-methoxyisoindol-1-yl)methylene]-3-ethylrhodanine, and
5-[(3-chloro-2-ethylisoindol-1-yl)methylene]-3-ethylrhodanine.

9. A photographic silver halide emulsion spectrally sensitized with a merocyanine dye comprising an isoindole nucleus represented by the formula

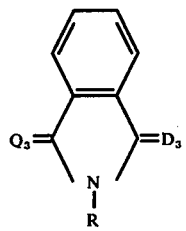

wherein R is an alkyl or substituted alkyl group;
Q₃ is a group represented by the formula

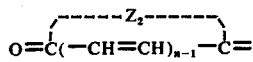

wherein n represents a positive integer from 1 to 2 and
Z₂ represents the non-metallic atoms necessary to complete an acidic nucleus of the type used in merocyanine dyes; and D₃ is a group represented by the formula

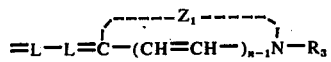

wherein n represents a positive integer from 1 to 2,
L represents a methine linkage,
R₃ represents an alkyl or substituted alkyl group; and
Z₁ represents the non-metallic atoms necessary to complete a basic heterocyclic nucleus of the type used in cyanine dyes.

10. A photographic silver halide emulsion spectrally sensitized with a merocyanine dye as in claim 9 wherein R is an alkyl or substituted alkyl group containing from one to four carbon atoms.

11. A photographic silver halide emulsion spectrally sensitized with a merocyanine dye selected from the group consisting of
3-ethyl-5-{2-ethyl-3-[(3-ethylbenzothiazolin-2-ylidene)ethylidene]isoindol-1(3H)-ylidene} rhodanine, and
3-ethyl-5-{2-ethyl-3-[(1,3,3-trimethylindolin-2-ylidene)ethylidene]isoindol-1(3H)-ylidene} rhodanine.

12. A photographic silver halide emulsion spectrally sensitized with a cyanine dye comprising an isoindole nucleus, said dye being represented by the formula

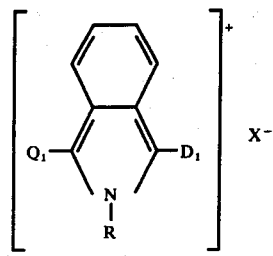

wherein R is an alkyl group;
X⁻ is an anion;
Q₁ is a group represented by the formula

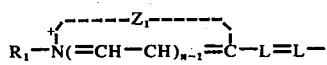

wherein n is a positive integer from 1 to 2;
L is a methine linkage;
R₁ is an alkyl group and
Z₁ represents the non-metallic atoms necessary to complete a thiazole nucleus, an oxazole nucleus, a selenazole nucleus, a thiazoline nucleus, a pyridine nucleus, a quinoline nucleus, an indolenine nucleus, or an imidazole nucleus; and
D₁ is a halogen atom, an alkoxy group, or a group represented by the formula

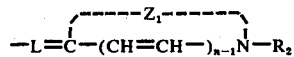

wherein n is a positive integer from 1 to 2;
L is a methine linkage;
R₂ is an alkyl group and
Z₁ is as defined above.

13. A photographic silver halide emulsion spectrally sensitized with a merocyanine dye comprising an isoindole nucleus represented by the formula (II)

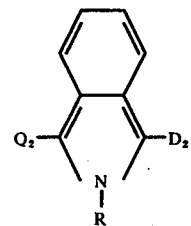

wherein R is an alkyl group;
D₂ is a halogen atom or an alkoxy group and
Q₂ is a group represented by the formula

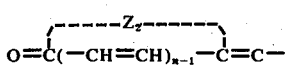

wherein n is a positive integer from 1 to 2;
L is a methine linkage and
Z₂ represents the non-metallic atoms necessary to complete a 2-pyrazolin-5-one nucleus, an isoxazolone nucleus, an oxindole nucleus, a barbituric acid nucleus, a thiobarbituric acid nucleus or a rhodanine nucleus.

14. A photographic silver halide emulsion spectrally sensitized with a merocyanine dye comprising an isoindole nucleus, said dye being represented by the formula

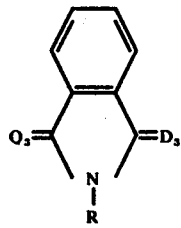

wherein R is an alkyl group and
Q₃ is a group represented by the formula

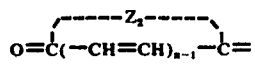

wherein $n$ is a positive integer from 1 to 2 and
Z₂ represents the non-metallic atoms necessary to complete a 2-pyrazolin-5-one nucleus, an isoxazole nucleus, an oxindole nucleus, a barbituric acid nucleus, a thiobarbituric acid nucleus, or a rhodanine nucleus; and
D₃ is a group represented by the formula

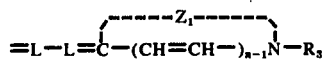

wherein $n$ is a positive integer for 1 to 2;
L is a methine linkage;
R₃ is an alkyl group and
Z₁ represents the non-metallic atoms necessary to complete a thiazole nucleus, an oxazole nucleus, a selenazole nucleus, a thiazoline nucleus, a pyridine nucleus, a quinoline nucleus, an indolenine nucleus, or an imidazole nucleus.

* * * * *

UNITED STATES PATENT AND TRADEMARK OFFICE
CERTIFICATE OF CORRECTION

PATENT NO. : 4,030,932
DATED : June 21, 1977
INVENTOR(S) : Derek David Chapman

It is certified that error appears in the above-identified patent and that said Letters Patent are hereby corrected as shown below:

Column 4, line 5, that part of the compound reading "1-alkyl-5,6-" should read --- 1-aryl-5,6- ---. (pg. 7, line 26)

Column 5, line 1, the formula should read as follows:

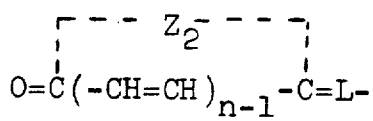

(pg. 9, line 10)

Column 6, line 57, delete "isoindole" and insert ---terminal---. (pg. 13, line 10)

UNITED STATES PATENT AND TRADEMARK OFFICE
CERTIFICATE OF CORRECTION

PATENT NO. : 4,030,932
DATED : June 21, 1977
INVENTOR(S) : Derek David Chapman

It is certified that error appears in the above-identified patent and that said Letters Patent are hereby corrected as shown below:

Column 11, line 7, that part of the formula reading

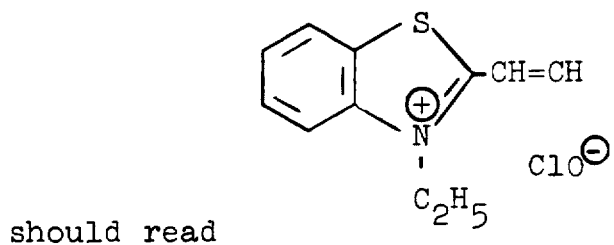

should read

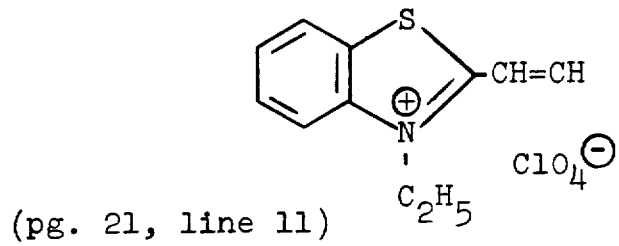

(pg. 21, line 11)

Column 15, Table II, "c2 control-undyed emulsion" should read --- c2 control-dyed emulsion ---. (pg. 27)

UNITED STATES PATENT AND TRADEMARK OFFICE
CERTIFICATE OF CORRECTION

PATENT NO. : 4,030,932
DATED : June 21, 1977
INVENTOR(S) : Derek David Chapman

It is certified that error appears in the above-identified patent and that said Letters Patent are hereby corrected as shown below:

Column 15, line 57, the formula should read as follows:

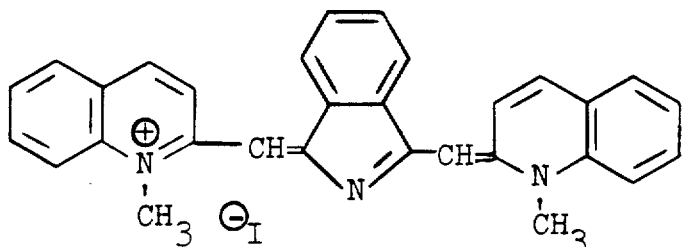

(pg. 28, line 6)

Column 16, delete lines 35-37 and 57-60. These lines are repetitious of the previous lines.

Column 18, line 66, the formula should read as follows:

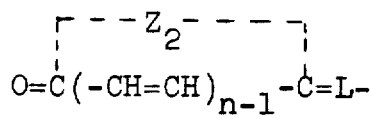

(pg. 34, Claim 8, line 7)

UNITED STATES PATENT AND TRADEMARK OFFICE
CERTIFICATE OF CORRECTION

PATENT NO. : 4,030,932
DATED : June 21, 1977
INVENTOR(S) : Derek David Chapman

It is certified that error appears in the above-identified patent and that said Letters Patent are hereby corrected as shown below:

Column 20, line 61, the formula should read as follows:

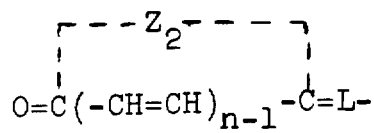

(pg. 6, Amendment dated 7/15/76, Claim 29, line 8)

Signed and Sealed this

Third Day of January 1978

[SEAL]

Attest:

RUTH C. MASON
*Attesting Officer*

LUTRELLE F. PARKER
*Acting Commissioner of Patents and Trademarks*